United States Patent
Love (10) Patent No.: US 12,330,881 B2
(45) Date of Patent: Jun. 17, 2025

(54) CONVEYOR SYSTEM WITH TRACK BOGIE AND PIVOTAL KING PIN

(71) Applicant: MGL Engineering Inc., Lakeland, FL (US)

(72) Inventor: Gary Love, Lakeland, FL (US)

(73) Assignee: MGL ENGINEERING INC., Lakeland, FL (US)

( * ) Notice: Subject to any disclaimer, the term of this patent is extended or adjusted under 35 U.S.C. 154(b) by 244 days.

(21) Appl. No.: 18/213,425

(22) Filed: Jun. 23, 2023

(65) Prior Publication Data
US 2024/0043222 A1    Feb. 8, 2024

Related U.S. Application Data

(60) Provisional application No. 63/394,784, filed on Aug. 3, 2022.

(51) Int. Cl.
*B65G 41/00* (2006.01)
*B60P 3/06* (2006.01)

(52) U.S. Cl.
CPC .................. *B65G 41/008* (2013.01)

(58) Field of Classification Search
USPC ......................................................... 198/302
See application file for complete search history.

(56) References Cited

U.S. PATENT DOCUMENTS

| | | | | |
|---|---|---|---|---|
| 6,311,821 B1* | 11/2001 | Douglas | ................ | B07B 1/005 |
| | | | | 414/919 |
| 6,929,113 B1* | 8/2005 | Hoover | ................ | B65G 21/14 |
| | | | | 198/588 |
| 7,455,173 B1* | 11/2008 | Fridman | ................ | B65G 21/14 |
| | | | | 198/313 |
| 8,584,826 B2* | 11/2013 | Smith | ................ | B65G 41/002 |
| | | | | 198/313 |
| 10,399,785 B1* | 9/2019 | Fike | ................ | B65G 41/002 |
| 10,556,752 B1* | 2/2020 | McCloskey | ........... | B65G 65/28 |
| 10,743,474 B1* | 8/2020 | Schlimgen | ........... | B65G 33/14 |
| 10,843,874 B2* | 11/2020 | McCloskey | ........... | B65G 41/002 |
| 2011/0139576 A1* | 6/2011 | Johannsen | ........... | B65G 41/008 |
| | | | | 198/302 |
| 2018/0339564 A1* | 11/2018 | Bratton | ................ | B65G 41/001 |
| 2019/0225429 A1* | 7/2019 | McCloskey | ........... | B65G 41/002 |
| 2019/0336980 A1* | 11/2019 | Ragnarsson | ......... | B02C 21/026 |
| 2019/0375598 A1* | 12/2019 | Igoe | ................ | B65G 67/24 |
| 2019/0389666 A1* | 12/2019 | Grindel | ................ | B65G 41/002 |

FOREIGN PATENT DOCUMENTS

| | | | | |
|---|---|---|---|---|
| CN | 109650092 A | * | 4/2019 | ........... B65G 41/007 |
| GB | 2489082 A | * | 9/2012 | ............. B02C 21/02 |
| WO | WO-02094444 A1 | * | 11/2002 | ............. B02C 18/18 |

\* cited by examiner

*Primary Examiner* — Gene O Crawford
*Assistant Examiner* — Muhammad Awais
(74) *Attorney, Agent, or Firm* — RISSO I.P.

(57) ABSTRACT

This disclosure provides a conveyor system having a track bogie with a pair of continuous tracks. A conveyor chassis is rotatably connected with the track bogie. A pivotal king pin is positioned between the continuous tracks and operable for pivoting between a raised position and a lowered tow position, the raised position allowing for operation of the continuous tracks on a ground surface and the lowered tow position allowing for connection with a tow vehicle.

11 Claims, 13 Drawing Sheets

CONVEYOR SYSTEM WITH TRACK BOGIE AND PIVOTAL KING PIN

CROSS-REFERENCE TO RELATED APPLICATIONS

This is a non-provisional application of U.S. Provisional Application No. 63/394,784, filed Aug. 3, 2022, the entirety of which is incorporated herein by reference.

BACKGROUND OF THE INVENTION

(1) Field of Invention

The present invention generally relates to a conveyor system and, more specifically, to a conveyor system with a conveyor bogie having a pivotal king pin for towing the conveyor.

(2) Description of Related Art

Conveyors have long been known in the art to transfer material, such as minerals or dirt, from one location to another. While some conveyors are fixed and stationary, others are meant to be mobile and are towed from site to site. Such mobile conveyors typically have a bogie that allows the conveyor to drive around a particular site and position the conveyor and belt in the desired location. A problem arises, however, when attempting to move the mobile conveyor between distant work sites. Transporting such a mobile conveyor is usually accomplished with a tow vehicle and a trailer. In other words, the mobile conveyor is mounted onto the trailer and towed between sites by the tow vehicle. While functional, securing the mobile conveyor onto the trailer is difficult, while also adding expense through purchase or rent of the trailer.

Thus, a continuing need exists for a new and improved conveyor system that allows for easy transport of a conveyor between distant work sites.

SUMMARY OF INVENTION

The present disclosure is directed to a conveyor system with a track bogie and pivotal king pin. More specifically, the conveyor system includes a track bogie having a pair of continuous tracks. The pivotal king pin is positioned between the continuous tracks. Notably, the king pin is pivotal between a raised position and a lowered tow position, the raised position allowing for operation of the continuous tracks on a ground surface and the lowered tow position allowing for connection with a tow vehicle.

In another aspect, the conveyor system also includes a conveyor chassis rotatably connected with and extending from the track bogie.

Further, or more transport jacks are attached with the conveyor chassis. The one or more transport jacks are operable for raising and lowering the track bogie.

In yet another aspect, a pair of lateral facing drive wheels are connected to the conveyor chassis, the lateral facing drive wheels being operable for rotating the conveyor chassis around the track bogie.

Additionally and in yet another aspect, one or more forward facing tow wheels are connected to the conveyor chassis.

In another aspect, the drive wheels are connected with a wheel lift mechanism, the wheel lift mechanism being operable for lowering the drive wheels to engage with a ground surface and, in doing so, lifting the tow wheels away from contact with the ground surface.

In another aspect, a bogie lock mechanism is included that is operable for locking the track bogie against the conveyor chassis.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention generally relates to a conveyor system and, more specifically, to a conveyor system with a conveyor bogie having a pivotal king pin for towing the conveyor. The following description is presented to enable one of ordinary skill in the art to make and use the invention and to incorporate it in the context of particular applications.

Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention.

However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for"performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 1:
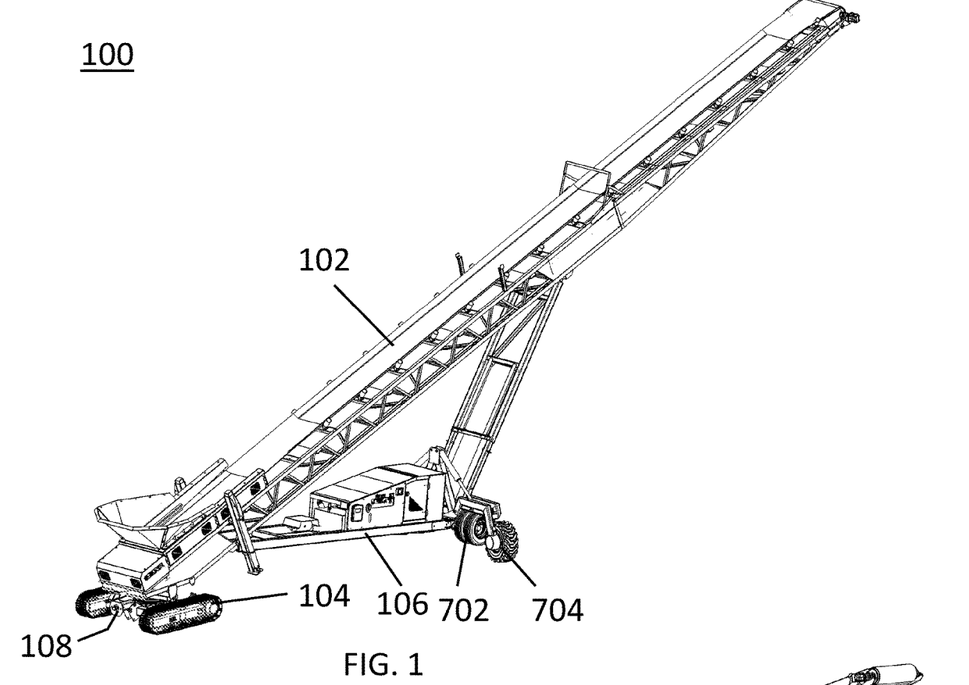
FIG. 1 is a front, side-view illustration of a conveyor having a conveyor bogie in accordance with various aspects of the present invention.
Figure 2:
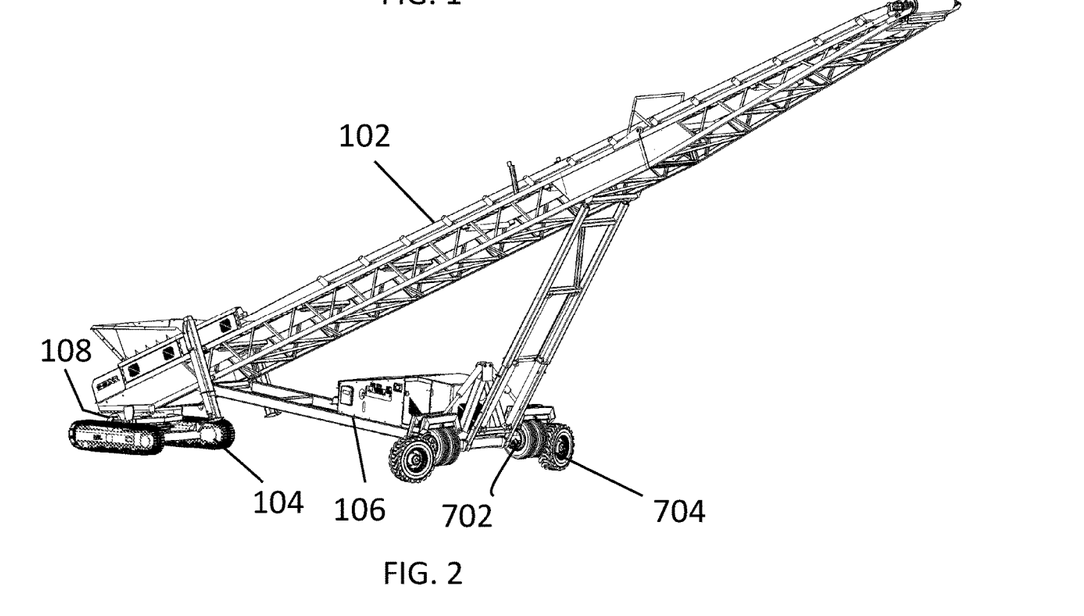
FIG. 2 is a rear, side-view illustration of the conveyor with the conveyor bogie in accordance with various aspects of the present invention.

As shown in FIGS. 1 and 2, the present disclosure provides a conveyor system 100 having a conveyor 102 with a track bogie 104. The conveyor 102 includes a conveyor frame and chassis 106 that is pivotally connected with and extending away from the track bogie 104. Also shown are a pair of lateral facing drive wheels 704 and one or more forward facing tow wheels 702. The lateral facing drive wheels 704 are motor driven and operable for rotating the conveyor frame and chassis 106 around the track bogie 104, whereas the forward facing tow wheels 702 are used to tow the conveyor system 100. Further, the conveyor 102 includes any suitable mechanism or device for conveying objects (e.g., gravel, grain, dirt, etc.) from one location to another, a non-limiting example of which includes a motor driven belt with any suitable components as required to control and drive the belt and convey the objects. Notably and as described above, the conveyor system 100 also includes a king pin 108 pivotally connected with the track bogie 104 that allows the conveyor system 100 to be operated on-site and then easily towed between sites. Further details are provided below.

Figure 3:
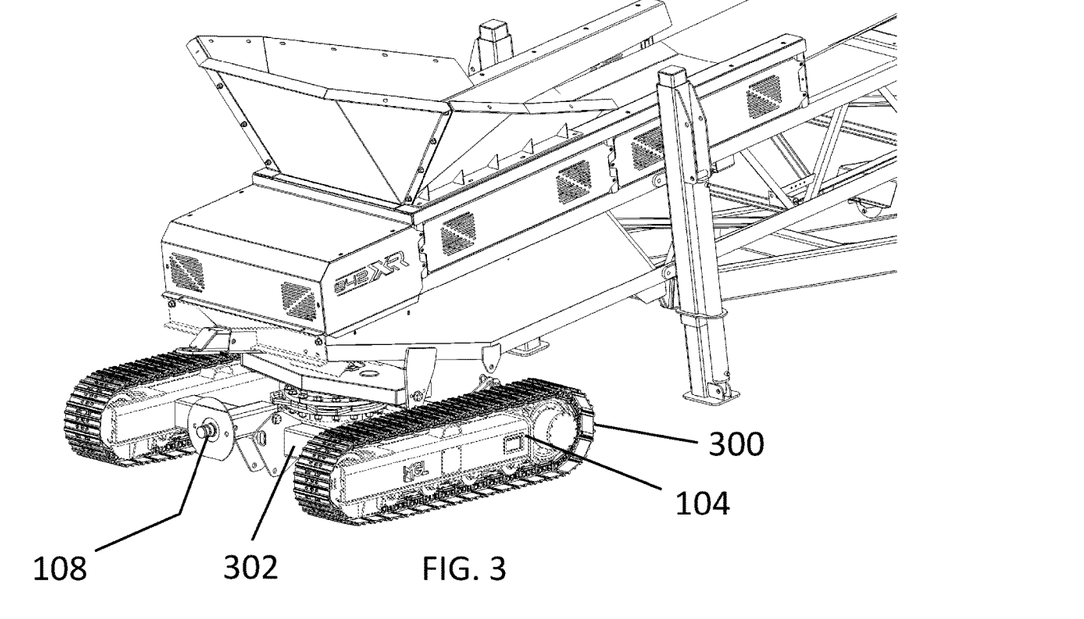
FIG. 3 is a front, side-view illustration of the conveyor bogie, depicting a pivotal king pin in a conveyor use position.
Figure 4:
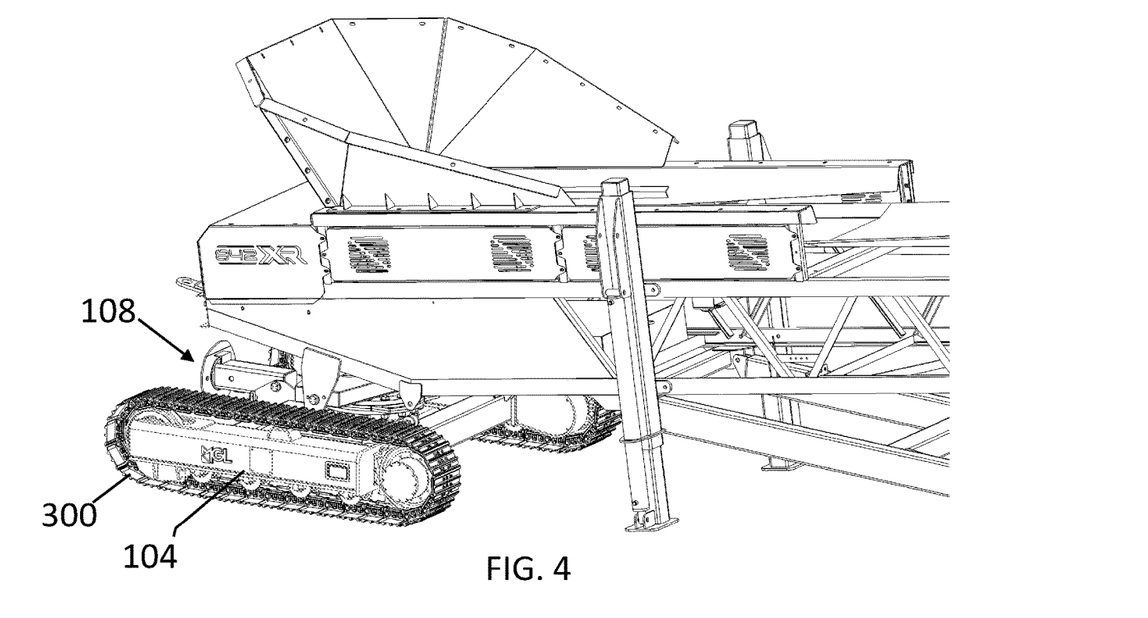
FIG. 4 is a rear, side-view illustration of the conveyor bogie, depicting the pivotal king pin in a conveyor use position.

As shown between FIGS. 3 and 4, the track bogie 104 has a pair of motorized continuous tracks 300 that are operable for maneuvering and driving the conveyor system around a work site. The continuous tracks 300 include any mechanism, device or components as required and understood by those skilled in the art to allow for selective control of the tracks 300, non-limiting examples of which include motors, bearings, and/or controls, etc. Importantly, a bogie frame member 302 is connected between the continuous tracks 300, while the king pin 108 is pivotally connected to the bogie frame member 302.

Figure 5A:
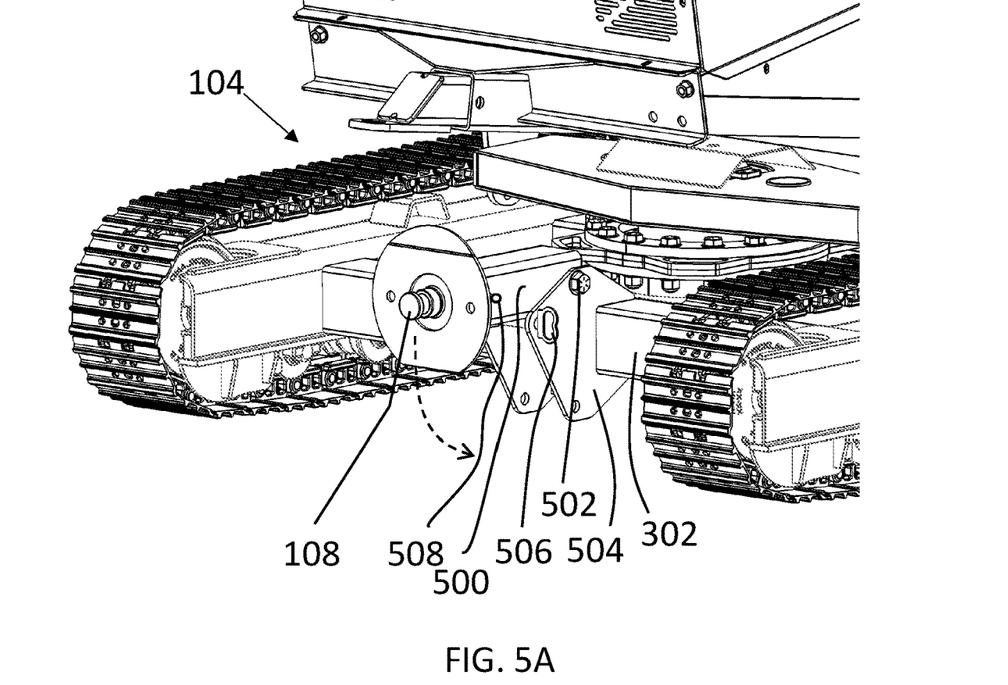
FIG. 5A is a close-up view illustration of the pivotal king pin in a conveyor use position.
Figure 5B:
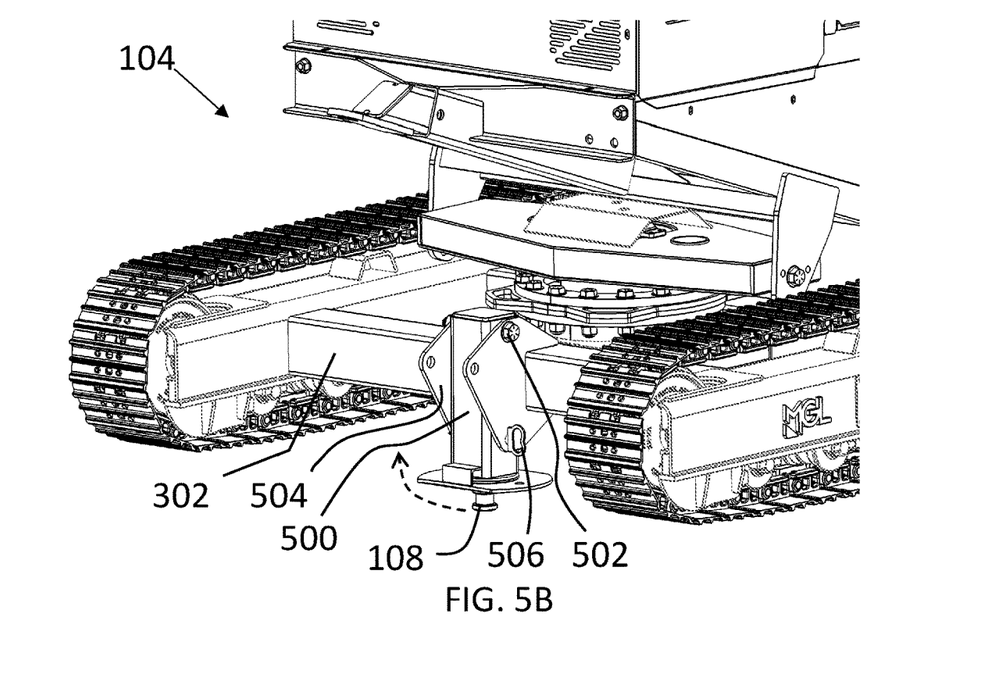
FIG. 5B is a close-up view illustration of the pivotal king pin in a lowered, tow position.

The pivotal king pin 108 is further illustrated in FIGS. 5A and 5B. The king pin 108 is connected with the bogie frame member 302 using any suitable mechanism or device that allows for selective positioning between a raised conveyor use position (as shown in FIG. 5A) and a lowered, tow position (as shown in FIG. 5B). For example, the kin pin 108 could be devised to slide up and down within a vertical track. As another example and as shown between FIGS. 5A and 5B, the king pin 108 is desirably pivotally attached to the bogie frame member 302 to allow the king pin 108 to be selectively pivoted between the conveyor use position (i.e., FIG. 5A) and the tow position (i.e., FIG. 5B). Any suitable mechanism or device can be implemented to allow for pivotal attachment of said king pin 108. As a non-limiting example, a king pin extender 500 is securely affixed with the king pin 108 at a distal end, while pivotally connected via a connector 502 (e.g., bolt, etc.) to a frame bracket 504 at a proximal end. The frame bracket 504 is affixed with the bogie frame member 302 and formed to receive the connector 502 to allow for pivotal connection of the king pin extender 500 and, thereby, the king pin 108.

A locking mechanism can be used to selectively lock the king pin 108 in each of the conveyor use and tow positions. The locking mechanism is any suitable mechanism or device operable for allowing a user to selectively lock the king pin 108 in the desired position. As a non-limiting example, the locking mechanism includes a pin 506 that can be selectively locked within an aperture 508 (e.g., hole) formed within the king pin extender 504.

It is desirable that when in the conveyor use position, as shown in FIG. 5A, the king pin 108 and extender 500 are pivoted away from the track bogie 104 to avoid interfering with any of the various bogie 104 components and ground surface. Separately, when in the tow position as shown in FIG. 5B, the extender 500 does not rest against the bogie frame member 302 and, instead, is secured in place by the connecter 502 and pin 506.

Figure 6A:
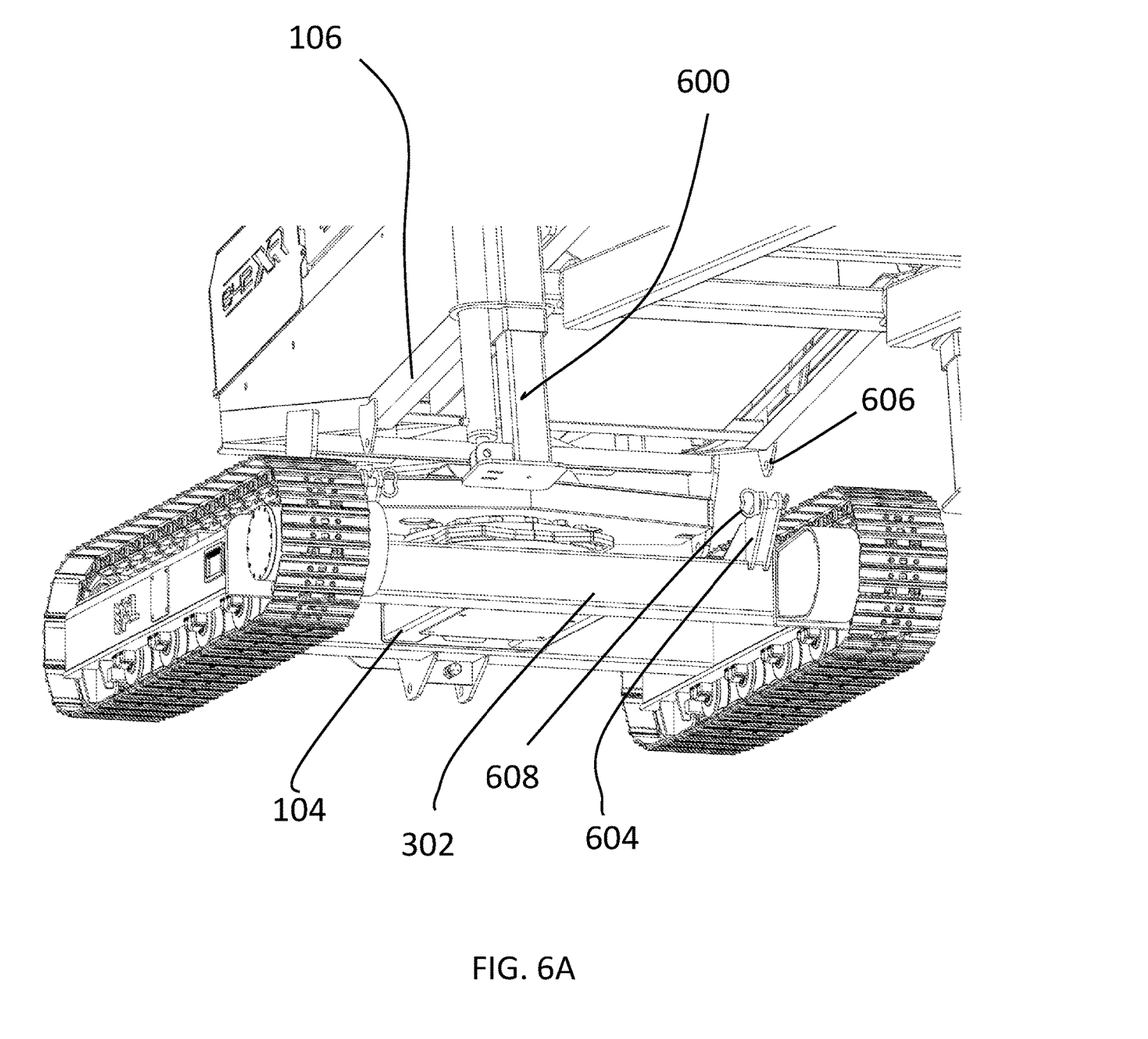
FIG. 6A is a close-up view illustration of a transport jack in a raised position.
Figure 6B:
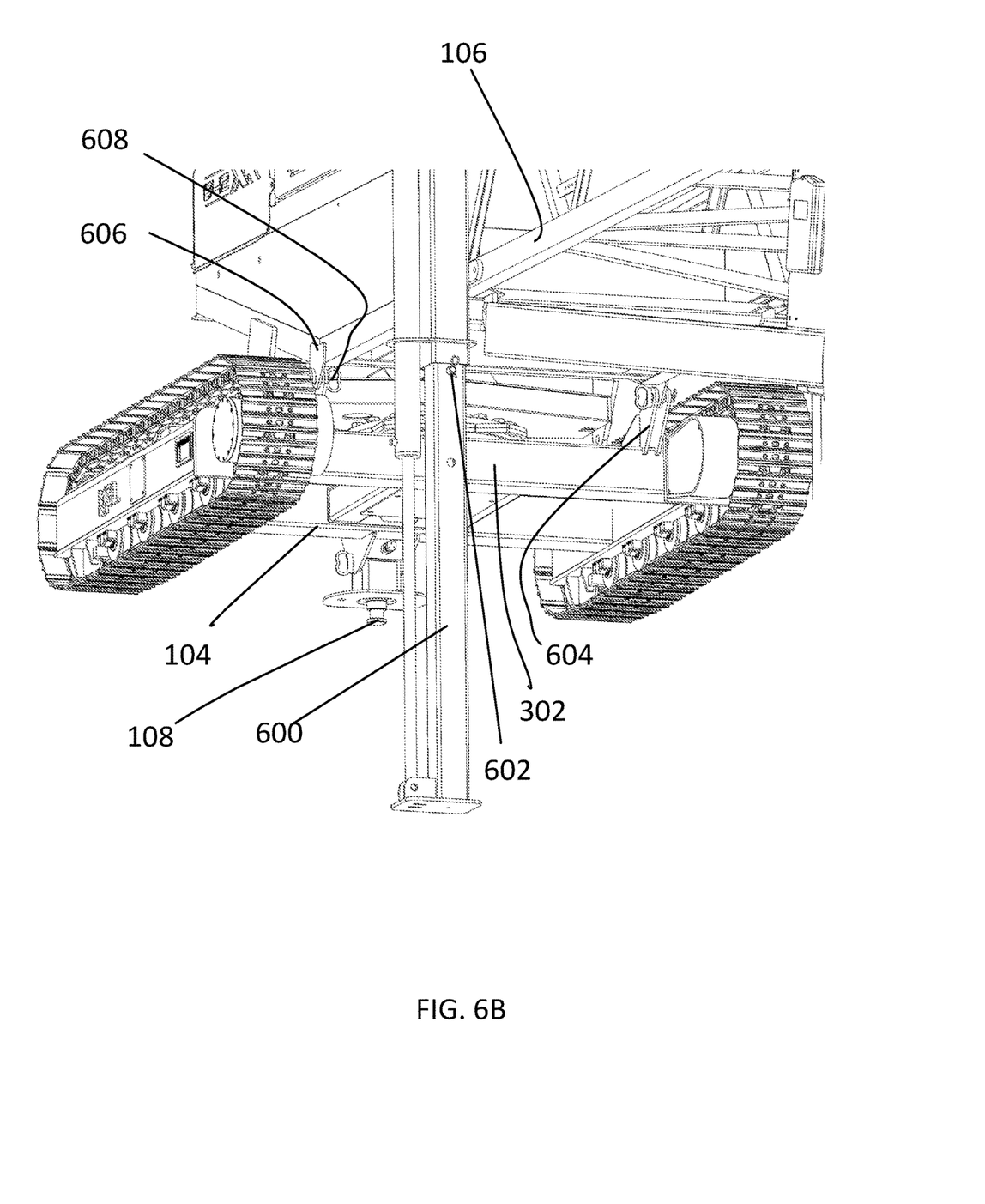
FIG. 6B is a close-up view illustration of the transport jack in a lowered position.

In order to transition between the conveyor use and tow positions, the conveyor system includes a lifting mechanism. The lifting mechanism is any suitable mechanism or device that is operable for selectively raising the track bogie 104 and king pin 108 to a receiving hitch height of the towing vehicle for road transport (or lowering the track bogie 104 from said height to a ground surface for use). As a non-limiting example and as shown in FIGS. 6A and 6B, the lifting mechanism includes a pair of hydraulic powered transport jacks 600 that can be powered between a raised position (as shown in FIG. 6A) and a lowered position (as shown in FIG. 6B). For safety, jack lock pins 602 (or other suitable locks) can be included to lock the transport jacks 600 in either the raised or lowered positions. Notably, the track bogie 104 includes a bogie lock mechanism that can be used to lock the track bogie 104 against the conveyor chassis 106 to prevent any motion therebetween. As can be appreciated by those skilled in the art, in use, the track bogie 104 is rotationally mobile with respect to the conveyor chassis 106. However, when towing the conveyor system, it is desirable that there is no motion between the track bogie 104 and conveyor chassis 106 to maintain a stable and safe towing structure. Thus, in this aspect, the bogie lock mechanism is any suitable mechanism or device that can be used to selectively lock the track bogie 104 and conveyor chassis 106 to restrict movement therebeteween. As a non-limiting example, the bogie lock mechanism includes one or more bogie lock brackets 604 (wielded to and extending from the bogie frame 302) that can be aligned with and locked against a conveyor frame lock bracket 606. Once aligned (as shown in the tow position depicted in FIG. 6B), the two brackets 604 and 606 can be locked together using a pin 608 or other suitable lock device. With the track bogie 104 locked against the conveyor chassis 106, the king pin 108 can be safely lowered onto the tow vehicle, with the transport jacks 600 then raised to allow for tow and transport of the conveyor system.

Figure 7A:
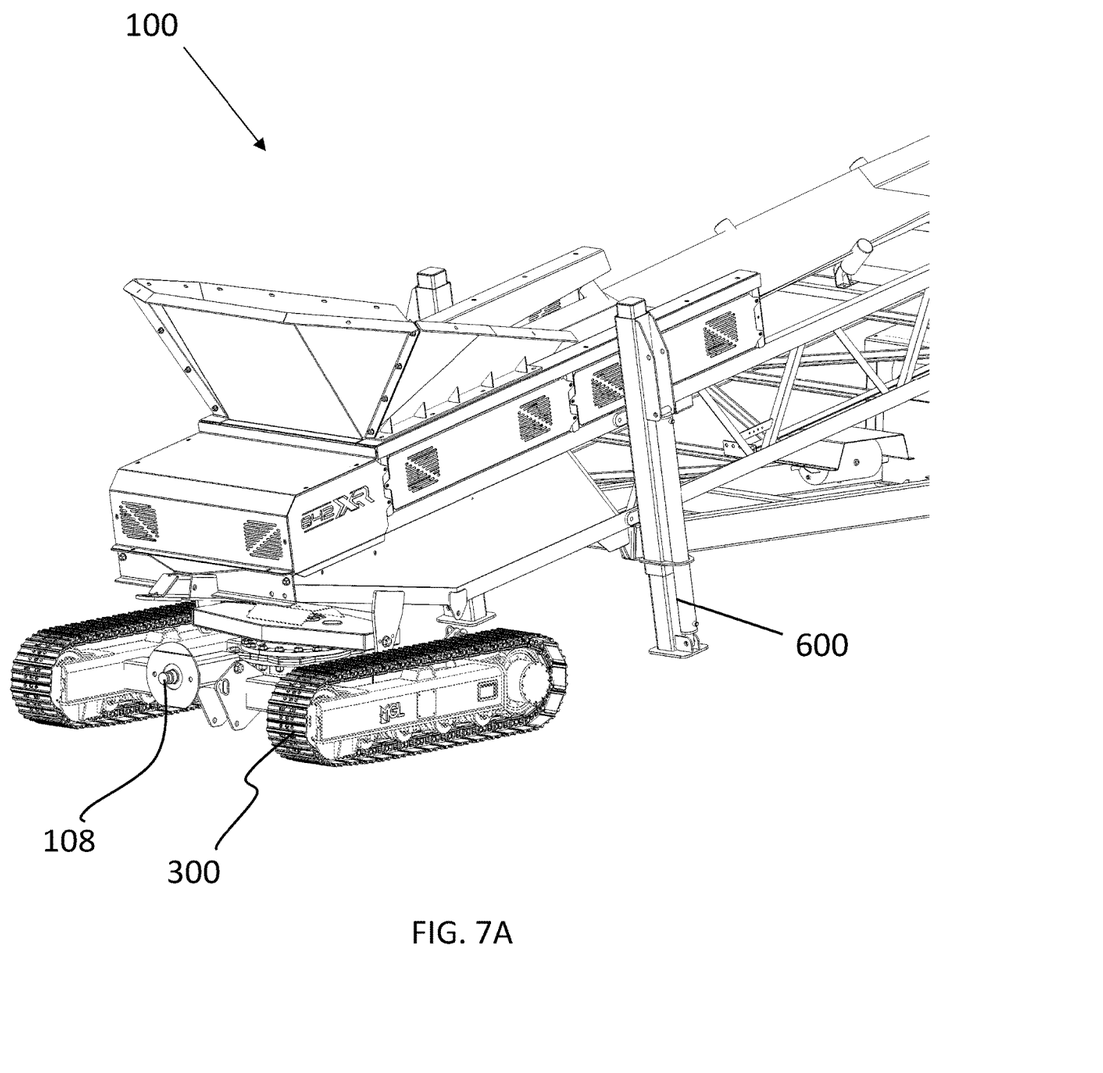
FIG. 7A is a front, side-view illustration of the conveyor bogie, depicting the pivotal king pin in a raised, conveyor use position.

For further understanding, FIGS. 7A through 7G depict the process by which
the conveyor system can be safely attached with a tow vehicle for transport. As shown in FIG. 7A, in conveyor use or operation mode, both the king pin 108 and transport jacks 600 are in the raised position. Thus, in conveyor use mode, the continuous tracks 300 allow the conveyor system 100 to be moved as desired around a job site without interference from the king pin 108. The tracks 300 are utilized in this mode for powered, linear movement of the conveyor system 100 along the ground. At mid length of the conveyor system 100, the rest of the weight of the conveyor rests on tires on the ground surface.

Figure 7B:
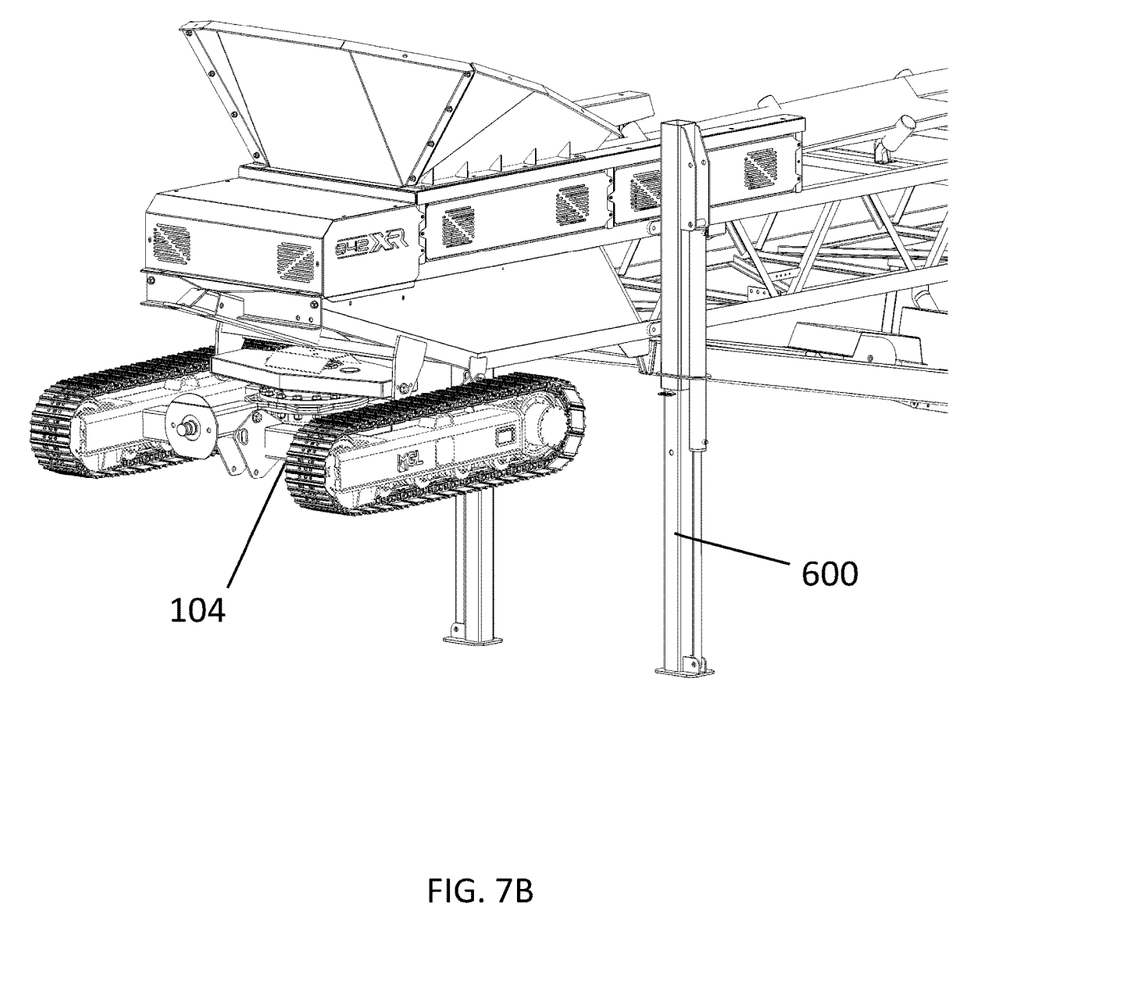
FIG. 7B is a front, side-view illustration of the conveyor bogie, depicting the transport jack being extended from the conveyor to lift the conveyor bogie.
Figure 7C:
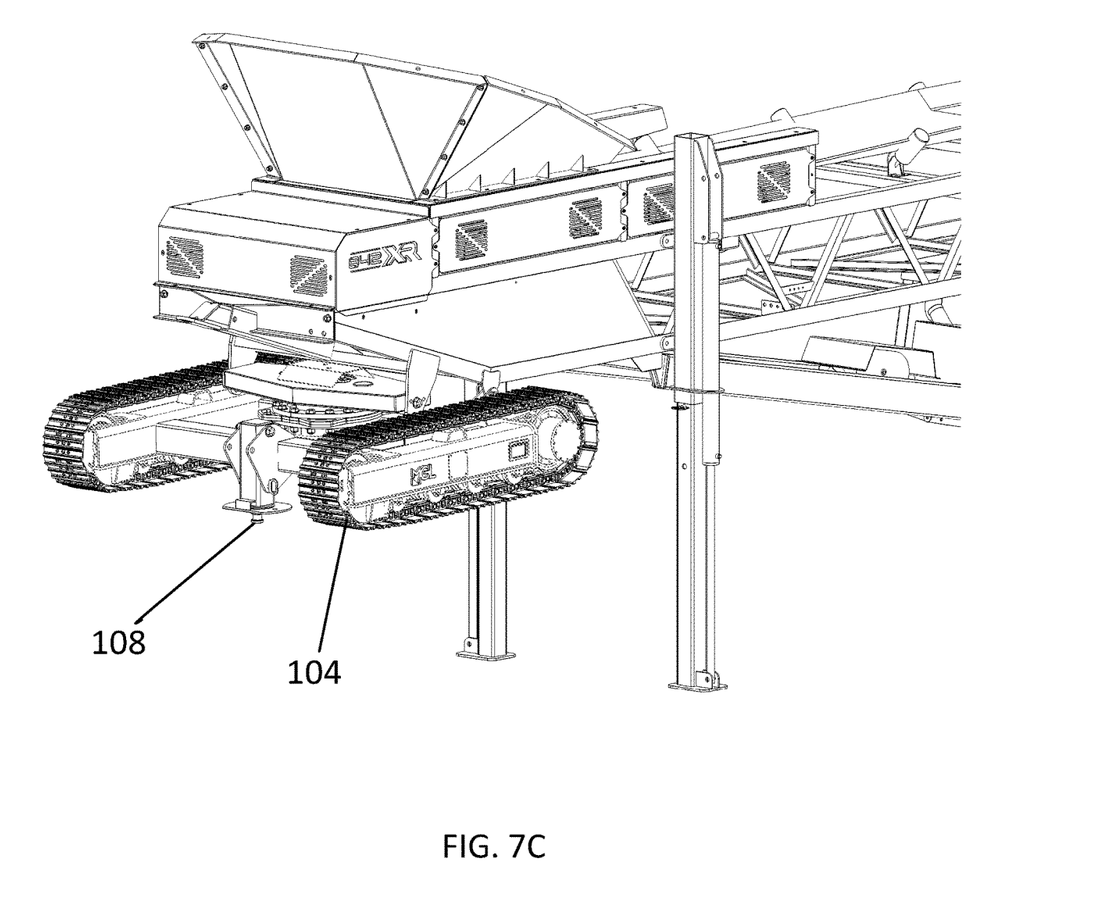
FIG. 7C is a front, side-view illustration of the conveyor bogie, depicting the pivotal king pin as pivoting downwards into a lowered, tow position.
Figure 7D:
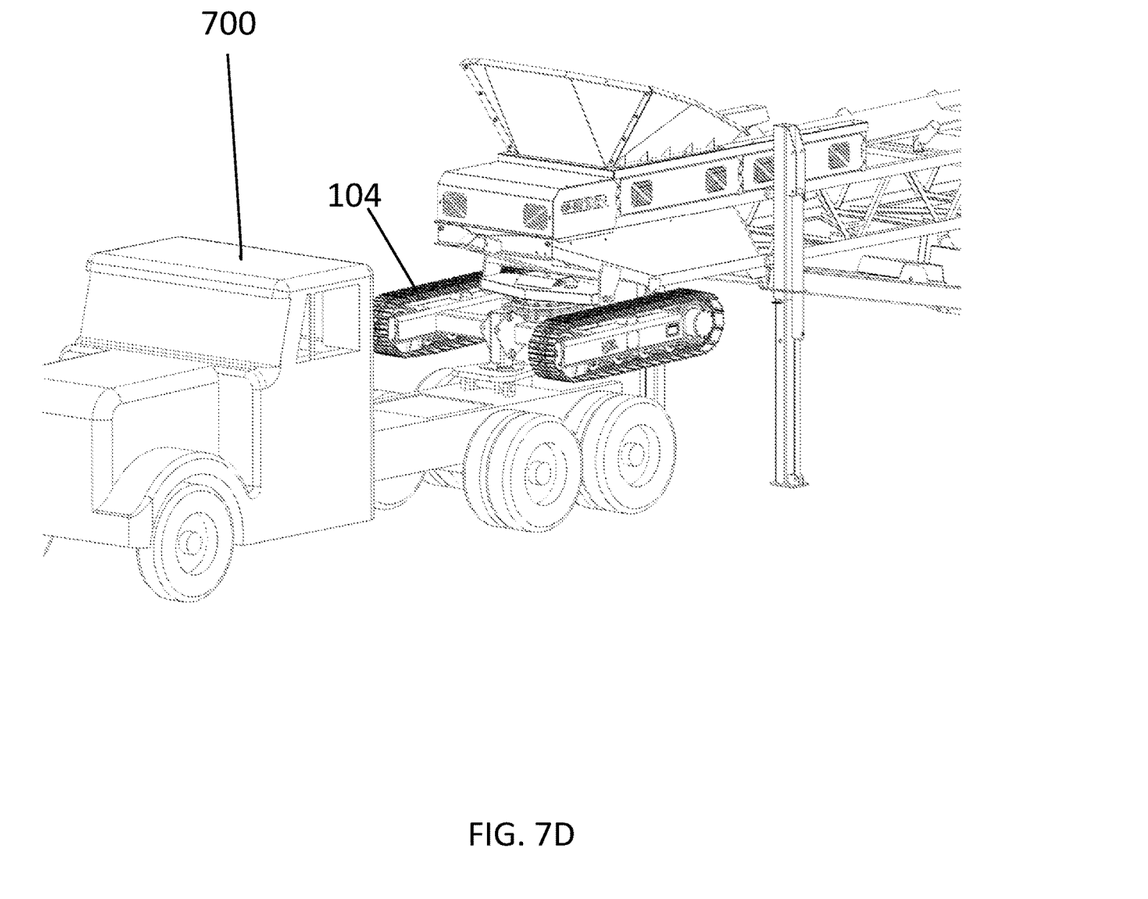
FIG. 7D is a front, side-view illustration of the conveyor bogie, depicting a tow vehicle backing into the conveyor bogie to connect with the pivotal king pin.

As shown in FIG. 7B, in order to prepare the conveyor system 100 for transport between job sites, the transport jacks 600 are lowered to raise the track bogie 104 up from the ground surface to provide clearance for the king pin to rotate into a downward position, thereby allow for connection of the tow vehicle. Thus, with the track bogie 104 raised, the king pin 108 can be pivoted downward into the tow position (as shown in FIG. 7C). Once raised and as shown in FIG. 7D, a tow vehicle 700 can be backed under the track bogie 104 to allow the king pin to be secured against a tow mount on the tow vehicle 700.

Figure 7E:
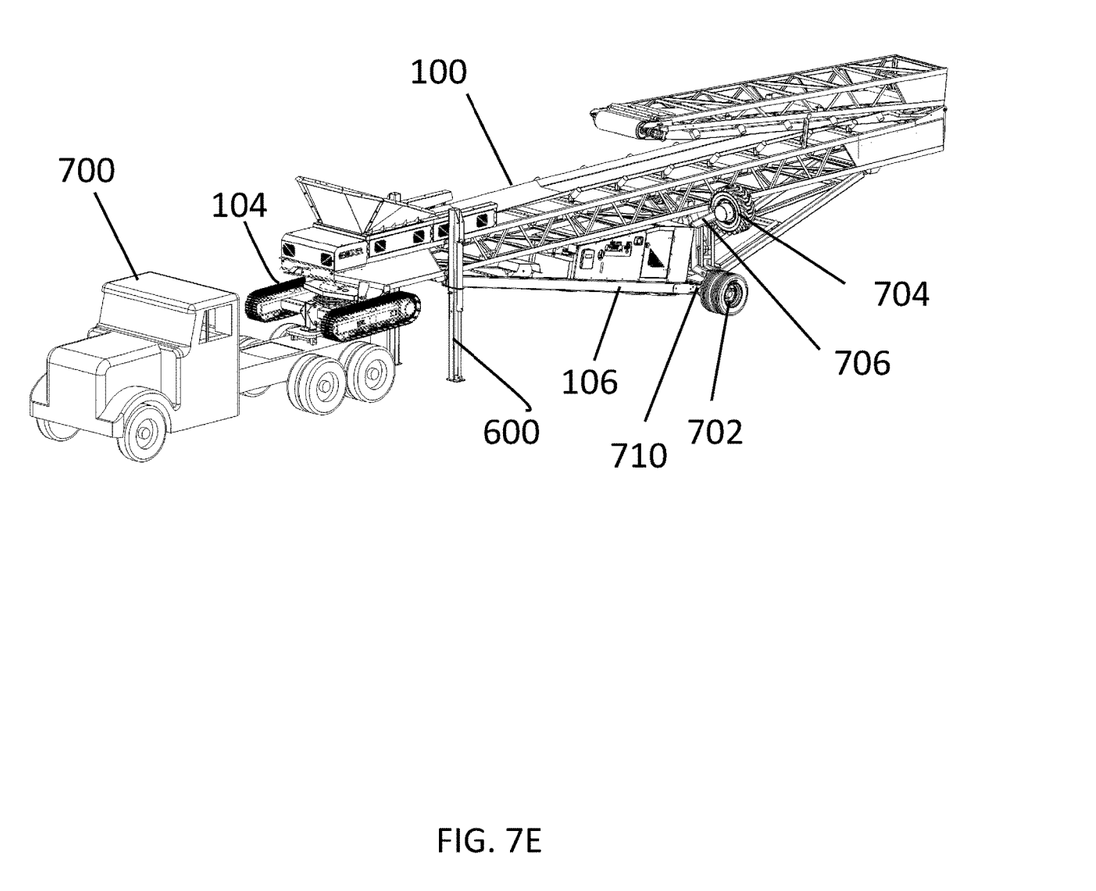
FIG. 7E is a front, side-view illustration of the conveyor and conveyor bogie, depicting a tow vehicle connecting thereto.

FIG. 7E depicts the conveyor system 100 being attached to the tow vehicle 700. As shown, the transport jacks 600 are lowered to raise the track bogie 104 to allow for connection of the tow vehicle 700. Also shown are forward facing tow wheels 702 that are fixed about the chassis 106 (with an axle 710) to support the tow vehicle 700 and allow for transport of the conveyor system. As referenced above, the conveyor system includes both forward facing tow wheels 702 and lateral facing drive wheels 704. The axle 710 is mounted to the chassis 106, with the forward facing tow wheels 702 and lateral facing drive wheels 704 operably affixed to the axle 106.

Figure 7F:
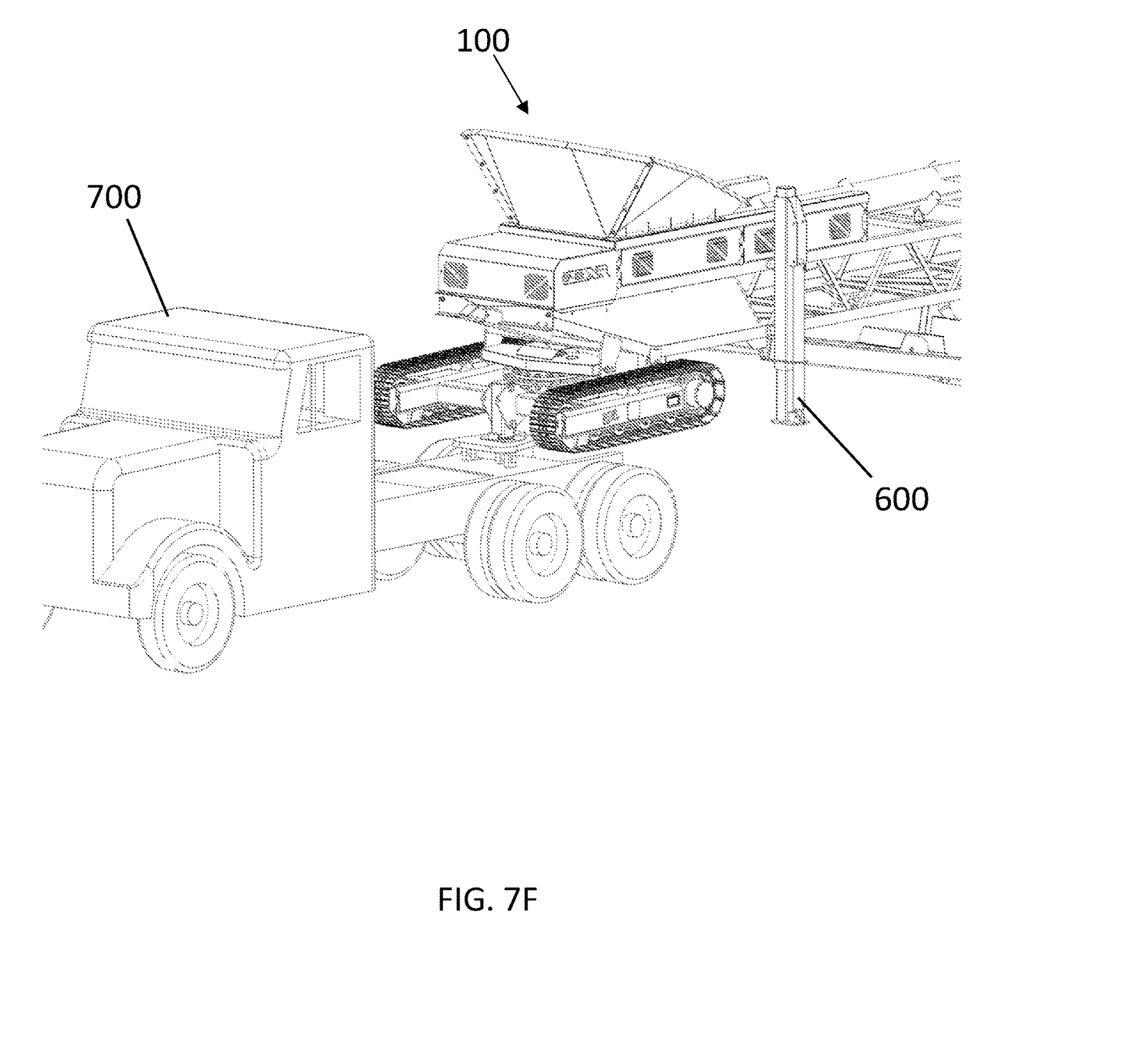
FIG. 7F is a front, side-view illustration of the conveyor bogie with a connected tow vehicle, depicting the transport jack as raised to allow for towing of the conveyor.
Figure 7G:
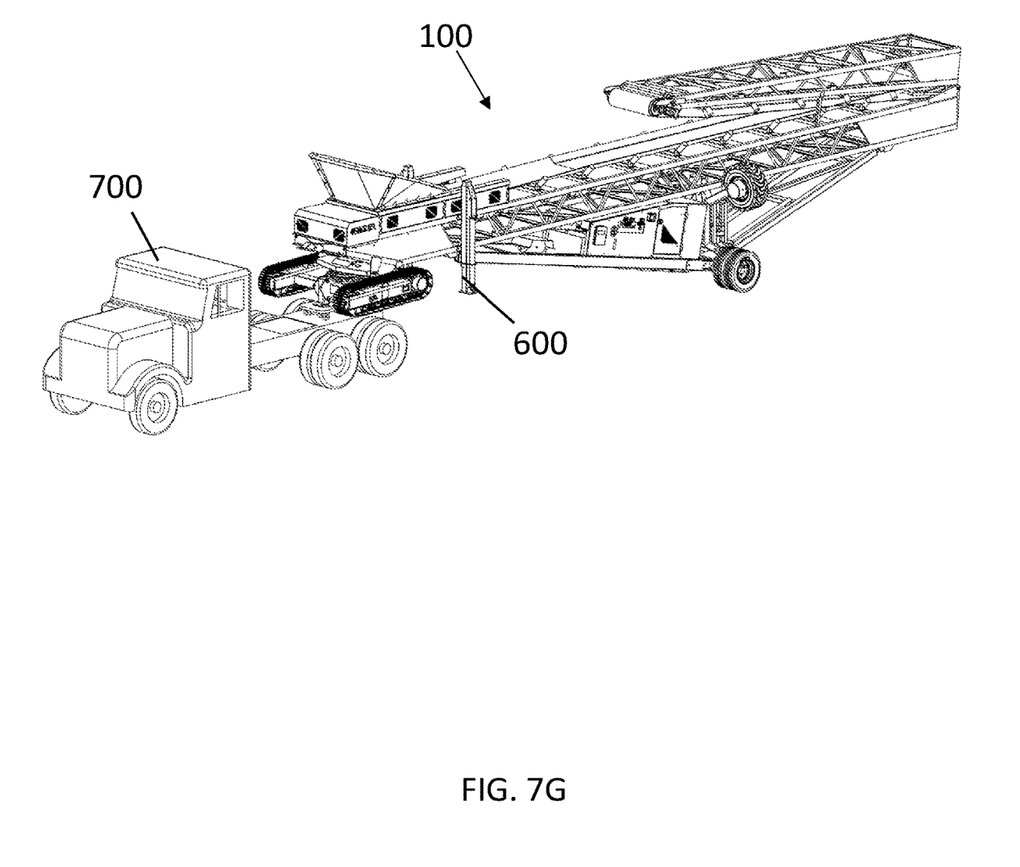
FIG. 7G is a front, side-view illustration of the conveyor bogie with a connected tow vehicle, depicting the transport jack as being raised to allow for towing of the conveyor.

The forward facing tow wheels 702 and lateral facing drive wheels 704 are selectively positionable upon the ground surface using any suitable mechanism or device that is operable as a wheel lift mechanism. As a non-limiting example, the lateral facing drive wheels 700 are attached with wheel frames 706 that are pivotally connected to the axle 710. A hydraulic mechanism or other suitable system can be attached to the wheel frames 706 to selectively raise and lower the lateral facing drive wheels 700. When lowered (as shown in FIGS. 1 and 2), the lateral facing drive wheels 700 can be used to drive the conveyor laterally around the track bogie 104. The track bogie 104 is attached with the chassis 106 such that the lateral facing (i.e., radial) drive wheels 700 can continuously drive the chassis 106 360 degrees (in either direction) around the track bogie 104. The continuous drivability in 360 degrees around the track bogie 104 is accomplished with a valve that allows for infinite rotational movement without causing the associated hydraulic hoses to get in bind or otherwise twisted around themselves and/or one another. Alternatively, when the lateral facing drive wheels 700 are raised (as shown in FIG. 7E), the forward facing tow wheels 702 are effectively lowered onto the ground surface to allow for towing of the conveyor system 100 (and tracking using the track bogie 104). As shown in FIGS. 7F and 7G, once the conveyor system 100 is securely affixed with the tow vehicle 700, the transport jacks 600 can be retracted to withdraw the transport jacks 600 from the ground surface and allow the tow vehicle 700 to tow the conveyor system 100.

Figure 7H:
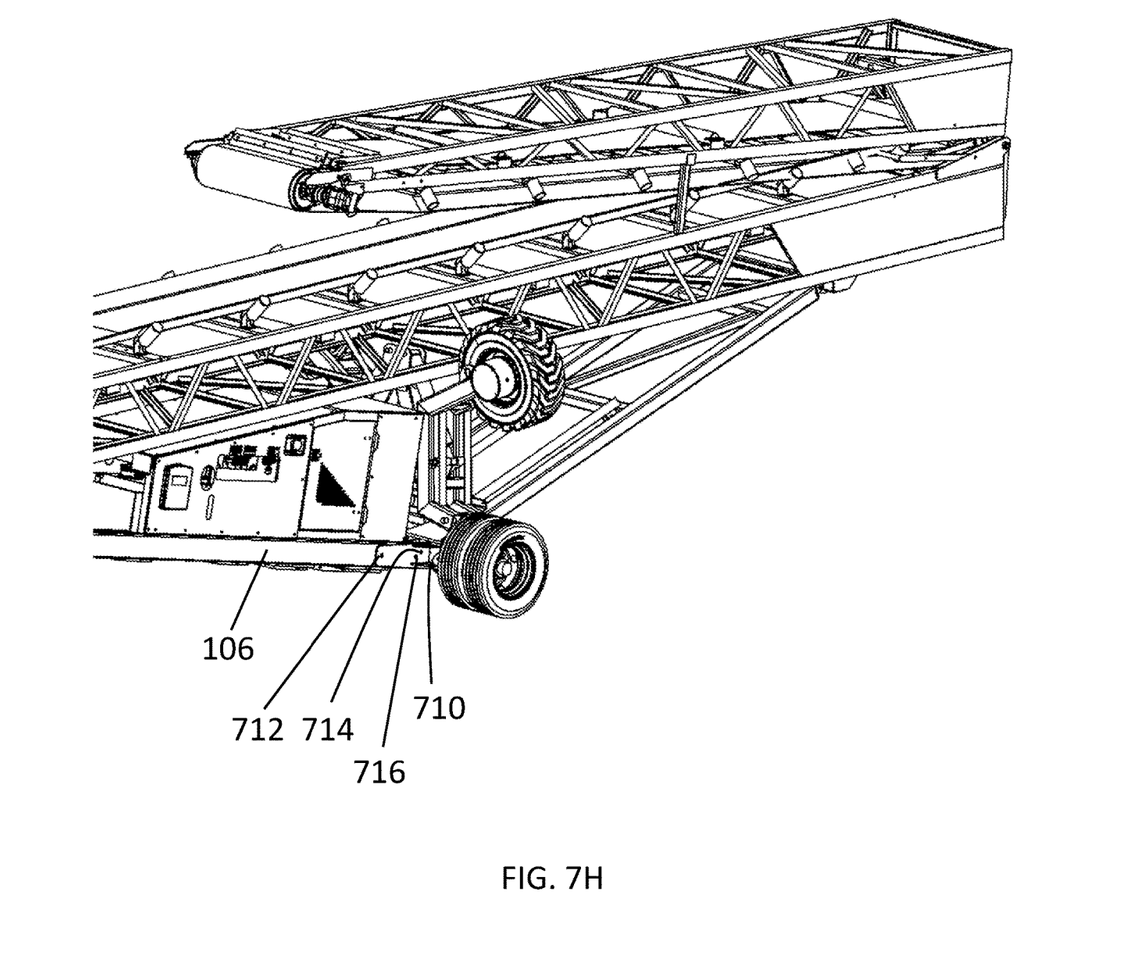
FIG. 7H is a close-up view illustration of the conveyor bogie.

As noted above and as shown in FIG. 7H, the axle 710 is connected (e.g., bolted, wielded, etc.) with the chassis 106. Desirably and in one aspect, the axle 710 is affixed to the chassis 106 such that it is adjustable with respect to the chassis 106 to selectively vary in angle relative with respect to the chassis 106. For example and as shown, the 710 is affixed (e.g., via bolts, etc.) at a first axle connection 712 and either a second axle connection point 714 or a third axle connection point 716. There may be circumstances when the track bogie is not attached with the conveyor chassis 106. In such a circumstance, the connection point between the axle 710 and chassis 106 can be altered (e.g., by changing holes through which bolts are affixed) between the second axle connection point 714 and the third axle connection point 716 to change the angle at which the axle 710 is attached to the chassis 106. This may be desirable to keep the drive wheels 704 perpendicular to the ground when the track bogie is not on the machine and the chassis 106 angle relative to the ground is different.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:
1. A conveyor system, comprising:
a track bogie having a pair of continuous tracks; and
a pivotal king pin positioned between the continuous tracks, the king pin being pivotal between a raised position and a lowered tow position, the raised position allowing for operation of the continuous tracks on a ground surface and the lowered tow position allowing for connection with a tow vehicle.

2. The conveyor system as set forth in claim 1, further comprising a conveyor chassis rotatably connected with and extending from the track bogie.

3. The conveyor system as set forth in claim 2, further comprising one or more transport jacks attached with the conveyor chassis, the one or more transport jacks being operable for raising and lowering the track bogie.

4. The conveyor system as set forth in claim 3, further comprising a pair of lateral facing drive wheels connected to the conveyor chassis, the lateral facing drive wheels being operable for rotating the conveyor chassis around the track bogie.

5. The conveyor system as set forth in claim 4, further comprising one or more forward facing tow wheels connected to the conveyor chassis.

6. The conveyor system as set forth in claim 5, wherein the drive wheels are connected with a wheel lift mechanism, the wheel lift mechanism being operable for lowering the drive wheels to engage with the ground surface and, in doing so, lifting the tow wheels away from contact with the ground surface.

7. The conveyor system as set forth in claim 6, further comprising a bogie lock mechanism, the bogie lock mechanism operable for locking the track bogie against the conveyor chassis.

8. The conveyor system as set forth in claim 2, further comprising a pair of lateral facing drive wheels connected to the conveyor chassis, the lateral facing drive wheels being operable for rotating the conveyor chassis around the track bogie.

9. The conveyor system as set forth in claim 2, further comprising one or more forward facing tow wheels connected to the conveyor chassis.

10. The conveyor system as set forth in claim 1, further comprising a bogie lock mechanism, the bogie lock mechanism operable for locking the track bogie against the conveyor chassis.

11. A method for towing a conveyor system, comprising acts of:
lowering one or more transport jacks to raise a track bogie from a ground surface, the track bogie having a pivotal king pin pivotally connected thereto;
raising, with a wheel lift mechanism, drive wheels from the ground surface to cause tow wheels to engage with the ground surface;
pivoting a pivotal king pin from a raised position to a lowered tow position;
connecting a tow vehicle to the king pin; and
raising the one or more transport jacks such that the conveyor system rests upon the tow vehicle, with the tow wheels positioned upon the ground surface.

\* \* \* \* \*